US012699612B2

(12) United States Patent
Haywood

(10) Patent No.: US 12,699,612 B2
(45) Date of Patent: Aug. 4, 2026

(54) DYNAMIC RANDOM ACCESS MEMORY (DRAM) DEVICE WITH WRITE ERROR PROTECTION

(71) Applicant: Rambus Inc., San Jose, CA (US)

(72) Inventor: Christopher Haywood, Fernandina Beach, FL (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/591,545

(22) Filed: Feb. 29, 2024

(65) Prior Publication Data

US 2024/0311219 A1 Sep. 19, 2024

Related U.S. Application Data

(60) Provisional application No. 63/490,193, filed on Mar. 14, 2023.

(51) Int. Cl.
G06F 11/00 (2006.01)
G06F 11/07 (2006.01)
(52) U.S. Cl.
CPC ........ G06F 11/0751 (2013.01); G06F 11/073 (2013.01)
(58) Field of Classification Search
None
See application file for complete search history.

(56) References Cited

U.S. PATENT DOCUMENTS

| 5,602,798 A | * | 2/1997 | Sato | G11C 7/1072 |
| | | | | 365/194 |
| 5,673,415 A | | 9/1997 | Nguyen et al. | |
| 7,221,615 B2 | | 5/2007 | Wallner et al. | |
| 8,255,783 B2 | | 8/2012 | Kim | |
| 8,707,110 B1 | * | 4/2014 | Shaeffer | G06F 11/1004 |
| | | | | 714/6.24 |
| 9,256,523 B2 | | 2/2016 | Takizawa | |
| 10,140,175 B2 | | 11/2018 | West et al. | |
| 2020/0150867 A1 | * | 5/2020 | Byun | G06F 3/0679 |
| 2020/0264943 A1 | * | 8/2020 | Tsern | G06F 11/1402 |

OTHER PUBLICATIONS

Google Scholar/Patents search—text refined (Year: 2025).*
Google Scholar/Patents search—text refined (Year: 2026).*

* cited by examiner

*Primary Examiner* — Christopher S Mccarthy
(74) *Attorney, Agent, or Firm* — Lowenstein Sandler LLP

(57) ABSTRACT

Technologies for providing write protection to an integrated circuit memory device are described. The integrated circuit memory device has an input port to receive write data and command data and a read data output port to send read data. A device includes a write protection mechanism to prevent write data from being written to a memory core. The write protection mechanism can mask the write data or abort a write operation in response to activation. The write protection mechanism can be activated in response to an error detected by a serial data buffer (SDB) device coupled to the integrated circuit memory device.

19 Claims, 10 Drawing Sheets

RECEIVE WRITE DATA TO BE
WRITTEN TO A MEMORY DEVICE
1002

SELECTIVELY PREVENT THE WRITE
DATA FROM BEING WRITTEN TO
THE MEMORY CORE 1004

DYNAMIC RANDOM ACCESS MEMORY (DRAM) DEVICE WITH WRITE ERROR PROTECTION

RELATED APPLICATIONS

This application claims the benefit of U.S. Provisional Patent Application No. 63/490,193, filed Mar. 14, 2023, the entire contents of which are incorporated by reference.

BACKGROUND

Modern computer systems generally include a data storage device, such as a memory component or device. The memory component may be, for example, a random-access memory (RAM) or a dynamic random-access memory (DRAM) device. The memory device includes memory banks made up of memory cells that a memory controller or memory client accesses through a command interface and a data interface within the memory device.

BRIEF DESCRIPTION OF THE DRAWINGS

The present disclosure is illustrated by way of example, and not by way of limitation, in the figures of the accompanying drawings.

DETAILED DESCRIPTION

Figure 1:
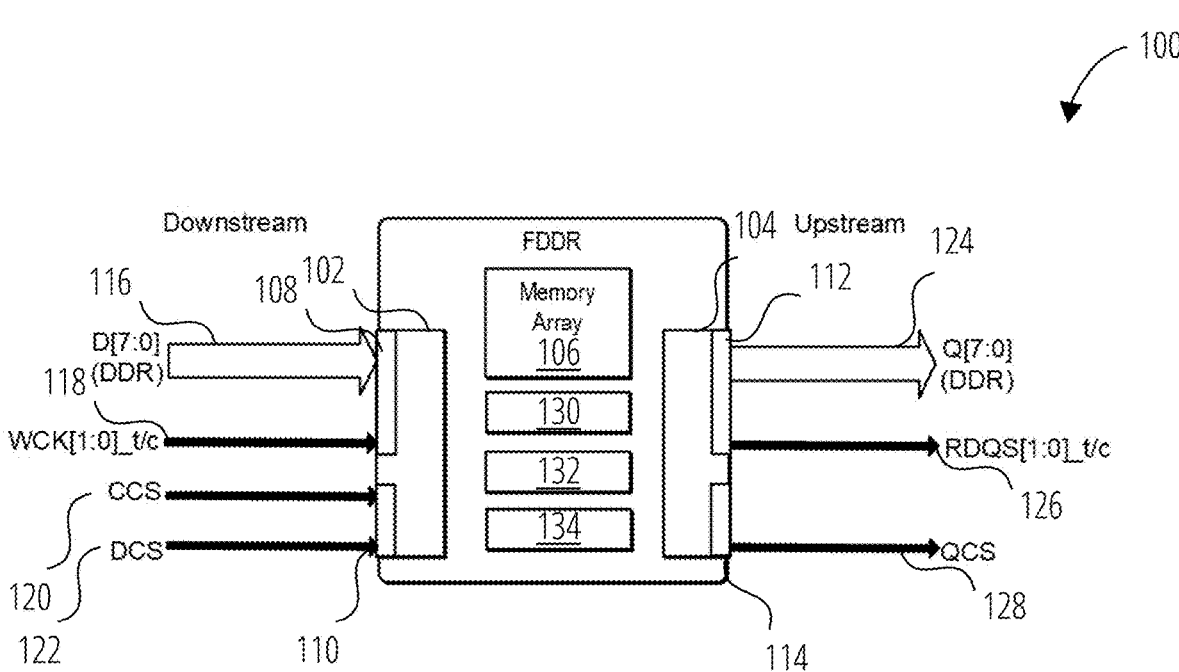
FIG. 1 is a block diagram of an integrated circuit memory device with unidirectional ports and write error protection, according to at least one embodiment.

The following description sets forth numerous specific details, such as examples of specific systems, components, methods, etc., to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The present disclosure is directed to embodiments of integrated circuit memory devices with unidirectional ports and a write protection mechanism. The present disclosure is also directed to embodiments of integrated circuit controller devices with unidirectional ports and a mechanism to activate a write protection mechanism on integrated circuit memory devices. In general, serial protocols used for communicating over a serial link need to be tolerant to link errors. Error checking of a serial link can be performed by a serial data buffer (SDB) device coupled to a DRAM device with unidirectional ports (referred to herein as FDDR device). Aspects and embodiments of the present disclosure can provide an FDDR interface with write error protection. Aspects and embodiments of the present disclosure can provide simplified SDB logic with minimal fixed latency for read and write commands with or without errors. Aspects and embodiments of the present disclosure can check for protocol violations, anomaly conditions, illegal commands, or the like. Aspects and embodiments of the present disclosure can allow out-of-band cyclic redundancy check (CRC) checking while passing through FDDR commands and data. In the event that the CRC checking detects an error, the write data can be prevented from being written to a memory core.

Aspects of the present disclosure can separate interface operations into downstream and upstream operations, providing alternate attach points for memory. For example, the downstream operations can include receiving interleaved or multiplexed input, including commands and write data, and the upstream operations can include sending read data, write acknowledgments, status data, errors, or the like. Aspects of the present disclosure can improve the average latency, simplify the translation from serial protocols to native memory protocols, reduce the complexity of buffering and scheduling logic, and allow the transition to optical interconnects. Aspects of the present disclosure can separate input and output pins (or other types of terminals) to allow concurrent interface operations and more closely match a host-side serial downstream/upstream bandwidth. The read and write transfers can occur at the same time (simultaneously or concurrently) on the separated input and output pins. There are no turnaround delays since the read and write transfers can occur at the same time, simultaneously, or concurrently. Since there are no turnaround delays, the overall latency is reduced. Aspects of the present disclosure can increase pin frequencies, pin margins, or both since the ports are unidirectional. For example, there are no drivers at the input port (e.g., receiver pads) because the input port is unidirectional. As such, the input port can have lower capacitances than bi-directional ports, with receivers and drivers sharing the same pins.

In at least one embodiment, a DRAM device (or integrated circuit memory device) includes an input port to receive at least one of commands or write data, a read data output port to output read data, a memory core to store data including the write data and the read data, and a write protection mechanism. The write protection mechanism can selectively prevent the write data from being written to the memory core. In at least one embodiment, the DRAM device includes a control port to receive control signals, such as a data select signal and a chip select signal, to activate the write protection mechanism. In at least one embodiment, in response to the data select signal and the chip select signal both being activated, the write protection mechanism can be activated and prevent the write data from being written. In other embodiments, the integrated circuit memory device includes a memory array, a first port to receive commands or write data, and a second port to transmit read data retrieved from the memory array in response to a read command. The integrated circuit memory device includes a write protection circuit to selectively prevent the write data from being written to a group of cells in response to activation of the write protection circuit.

In at least one embodiment, an interface between the memory device (an FDDR DRAM device) and its associated serial data buffer has been previously described as a "D" input bus to transport commands and write data from the host or controller together with a "Q" output bus to transport read data returning to the host or controller. This interface can support many options for control signals with the example as presented previously using a Command Chip Select (CCS) and a Data Chip Select (DCS) to differentiate the payload on the D bus to the DRAM as containing commands or write data, respectively, although other embodiments could be chosen. With the CCS/DCS control signals, there is an unused combination of both inputs active at the same time, which can be used to indicate a variety of alternate conditions of the D payload. One example of this would be to indicate that the data present in the payload should not be written to the DRAM core, indicating either an upstream error between the host or controller and the serial data buffer either in the corresponding command or command sequence (ACT, WR) or the write data payload itself. It would be possible for an error option to be programmed into the DRAM such that any simultaneous assertion of CCS and DCS would invalidate the entire write data payload for that detected write sequence. This simplification to error management also enables very flexible timing in a serial data buffer and the upstream protocol used to transport commands and data. Read and write command timing for a DRAM is a significant number of clock cycles (e.g., from ACT to RD or WR is 46nCK at DDR-6400). In addition, FDDR has increased flexibility to present WR data. This means that a cycle redundancy check (CRC) implementation for a given packet or data transport unit (e.g., FLIT) may not need to occur immediately and may be delayed and cover multiple transport units to improve efficiency within any given protocol. If a serial protocol were, for example, ten times (10×) faster than the DDR rate, then, for 46 clocks (nCK), the equivalent serial bit time would be 460UI on each serial lane. However, a write cycle could not be completed until the ACT/WR sequence (or ACT-WR or combined WR-RC), and corresponding data payloads had been verified as correct. Read sequences could be passed through to the DRAM without consequence to data integrity, provided the host or controller acknowledges the error and replays the command. Any delays in receiving the WR payload would push the WR data being sent to the DRAM but not affect the actual WR cycle time.

In some implementations, FDDR DRAM devices would not know the nature of the error or other reasons for the mask operation and would act to protect the DRAM core array when signaled to do so. Therefore, a write mask and error protection could be provided at the same time, provided upstream protocols support masked operations in addition to write protection on received or other errors. Examples of other error types could be encrypted serial interfaces, and an anomaly could be detected in encryption or decryption. In other embodiments, the write protection mechanisms described herein can be implemented in other integrated circuit memory devices, such as Flash memory, or the like. Other implementations or signaling can provide the same functionality. Additional details of the FDDR DRAM devices are described below with respect to FIG. 1.

FIG. 1 is a block diagram of an integrated circuit memory device 100 with unidirectional ports and write error protection, according to at least one embodiment. The integrated circuit memory device 100 (hereinafter "memory device 100") includes a downstream serial interface 102, an upstream serial interface 104, and a memory array 106. The downstream serial interface 102 includes an input port 108 and a control port 110. The upstream serial interface 104 includes an output port 112 (also referred to as a read data output port) and a control port 114. In at least one embodiment, the input port 108, the control port 110, the output port 112, and the control port 114 are unidirectional ports. The memory device 100 can use serial data buffers acting as pin expander devices, freeing a host or controller device of a higher DRAM pin count when constructing a rank of memory. Serial interfaces can have a non-zero error rate and can require some form of error detection and/or correction to allow for commands or data with errors to be executed correctly. The memory device 100 includes write error protection (and serial data buffers) that allows masking write data on error detection.

In at least one embodiment, the input port 108 receives interleaved input 116 and a first timing reference 118. The first timing reference 118 can be differential clock strobes (e.g., WCK[1:0]_t/c). The first timing reference 118 can be a single-ended clock signal or strobe. The interleaved input 116 can include commands (e.g., read commands, write commands) and write data. The control port 110 receives one or more control signals that specify that the interleaved input is the one or more commands or the write data. As illustrated in FIG. 1, the control port 110 receives a first command signal 120 (Command Chip Select (CCS)) that specifies that the interleaved input 116 is a command or a second command signal 122 (DCS) that specifies that the interleaved input 116 is write data. The first command signal 120 can be a chip select type signal, a strobe signal, an enable signal, a command enable signal, or the like. In at least one embodiment, the first command signal 120 and the second command signal 122 can be communicated as different levels of the same signal. Using two command signals allows four states to be used, including a command state, a data state, an unused status state (e.g., both the first command signal 120 and the second command signal 122 being asserted together), or any unused state, for example.

In at least one embodiment, the output port 112 transmits output data 124 and a second timing reference 126. The output data 124 can be read data, status data, error data, write acknowledgments, or the like. The second timing reference 126 can be a clock signal, such as differential clock strobes (e.g., RDQS[1:0]_t/c). The second timing reference 126 can be a differential clock signal or a single-ended clock signal, or a strobe. In at least one embodiment, the input port 108 receives write data, and output port 112 transmits read data concurrently. In at least one embodiment, the input port 108 receives command data, and the output port 112 transmits read data concurrently. The control port 114 transmits one or more control signals that specify that the output port 112 is enabled or ready with the read data. As illustrated in FIG. 1, the control port 114 transmits an output enable signal 128 (QCS) that specifies that the output port 112 is enabled for the read data. The output enable signal 128 can be a chip select type signal, a strobe signal, an enable signal, a command enable signal, or the like.

In at least one embodiment, the input port 108 and the output port 112 allow for concurrent interface operations, such as write data and read data being transferred concurrently or at the same time. The input port 108 and the output port 112 allow a closer match to the host-side serial downstream and serial upstream bandwidths. Using the separate input port 108 and the output port 112, there are no turnaround delays because the read and write transfers can co-occur. This can reduce the overall latency of the memory device 100.

In at least one embodiment, the interleaved input 116 includes input packets that are either command packets or write data packets. Alternatively, the input packet can include a command or data and error correction code (ECC) data. The interleaved input 116 can include the following packet examples, <CMD:DATA> or <CMD:DATA:ECC>. That is, the input packet can include a command or data. In at least one embodiment, the output data 124 includes output packets. The output packet can include read data, status data, data and ECC data, or status data and ECC data. The output data 124 can include the following packet examples, <DATA>, <STATUS>, <DATA:ECC>, or <STATUS:ECC>. It should be noted that the ECC data can be implemented differently. For example, the ECC data can be sent immediately following the relevant packet, as a set of bits in a dedicated lane or lanes, or as a set of dedicated bits in a fixed, regular repeating pattern to protect the previous block independent of packet boundaries.

In at least one embodiment, the output port 112 is coupled to or includes driver circuitry. The driver circuitry is used to drive signals on the output port 112. In at least one embodiment, the driver circuitry transmits the read data or other output data 124. In at least one embodiment, the driver circuitry transmits the output data 124 and the second timing reference 126. In contrast, a bi-directional port includes both a driver and a receiver. A bi-directional port can have signal interference between the driver and receiver. In at least one embodiment, the input port 108 is a unidirectional port coupled to receiver circuitry and does not include driver circuitry. This can reduce the capacitance on the input port 108. Reducing the capacitance on the input port 108 can increase receivers' margins and allow them to operate at a higher frequency.

In at least one embodiment, the receivers of the input port 108 can operate at different frequencies than the transmitters of the output port 112. For example, in one embodiment, the receivers can operate at a higher frequency than the transmitters. In other embodiments, the receivers and the transmitters can operate at the same frequency. In at least one embodiment, the memory device 100 is compatible with a Joint Electron Device Engineering Council (JEDEC) memory standard. For example, the memory device 100 (FDDR) can have an identical pinout as a double data rate (DDR) DRAM memory device. The memory device can optionally operate with bi-modality. The bi-modality can be configurable. The pins, however, can be assigned to the respective unidirectional ports.

In at least one embodiment, the input port 108, the output port 112, the control port 110, and the control port 114 are coupled to a serial data buffer (SDB) device coupled to a downstream serial link and an upstream serial link. The SDB device can be coupled to multiple downstream serial links and upstream serial links to support multiple memory devices. In at least one embodiment, the SDB device includes a downstream serial interface and an upstream serial interface to communicate with a host (also referred to as a host-computing device). The downstream serial interface includes a receiver, and the upstream serial interface includes a transmitter. The downstream serial interface can include a differential pair of receivers, and the upstream serial interface can include a differential pair of transmitters. For example, an SDB device coupled to two memory devices can have two differential pairs of transmitters and two differential pairs of receivers. In at least one embodiment, the downstream serial link includes a differential pair of receiver lines, and the upstream serial link includes a differential pair of transmitter lines. In at least one embodiment, the downstream serial link can include an optical-to-electrical (O2E) converter that converts an optical signal to an electrical signal. The upstream serial link can include an electrical-to-optical (E2O) converter that converts an electrical signal to an optical signal. In another embodiment, the SDB device can be an optical SDB device with an optical interface coupled to optical links with the host and an electrical interface coupled to the memory device 100. Additional details of the SDB devices are described below with respect to FIG. 2, FIG. 4, FIG. 7, FIG. 8, and FIG. 9.

During the operation of the memory device 100, the interleaved input 116 can include a first input packet with a first command and a second input packet with first write data. The first timing reference 118 includes a write clock signal (WCK) for the writing data's timing. The write clock signal can be one or two input strobes (e.g., two input strobes when the clock signal is a differential clock signal). The memory device 100 receives the first command signal 120 when the interleaved input 116 is the first command and the second command signal 122 when the interleaved input is the first write data. The first command signal 120 and the second command signal 122 specify whether the incoming packet is a command or write data. In at least one embodiment, the memory device 100 includes a command decoder 130 and a write buffer 132 (e.g., write first-in-first-out (FIFO) buffer) and write protection mechanism 134. The command decoder 130 is loaded with the first command responsive to the first command signal 120. The write buffer 132 is loaded with the first write data responsive to the second command signal 122. The functionality of the write protection mechanism 134 is described in more detail below.

During the operation of the memory device 100, the output data 124 can include a first output packet with first read data. The second timing reference 126 can include a read clock signal. The read clock signal can be one or two read clock strobes (e.g., RDQS[1:0]_t/c when the read clock signal is a differential signal). The output data 124 can include a second output packet with first status data, write acknowledgment, errors, etc. The memory device 100 transmits the output enable signal 128. The output enable signal 128 can specify that the first read data is enabled on the output port 112. Alternatively, the memory device 100 transmits the output enable signal 128 to specify that status data, error data, or the like is ready or enabled on the output port 112.

In at least one embodiment, the memory device 100 includes a register to store a write latency (WL) value. The WL value specifies an amount of time between when a write command is received at the input port 108, and the corresponding write data is transferred to the memory array 106. The WL value can be programmable. In another embodiment, the memory device 100 can have a WL parameter that specifies the amount of time it takes the write data to be ready to transfer to the memory array 106, and the WL value can be an offset value that is added or subtracted from the WL parameter to specify when the write data is transferred from the write buffer 132 to the memory array 106.

In at least one embodiment, the WL value can be used to transfer whatever data is loaded into the write buffer 132 to the memory array 106. In another embodiment, write data must be pre-loaded into the write buffer 132 before the specified WL value expires. In another embodiment, the "posted" data is committed to the memory array 106 at a write command immediately-whatever is in the write buffer 132 is loaded into the memory array 106 at a write command. The DRAM write command is not needed until it needs to send new write data. It should be noted that read operations to the exact same location should be prevented in this scenario. In another embodiment, any intermediate WL value can be pre-loaded into the memory device 100.

Figure 5:
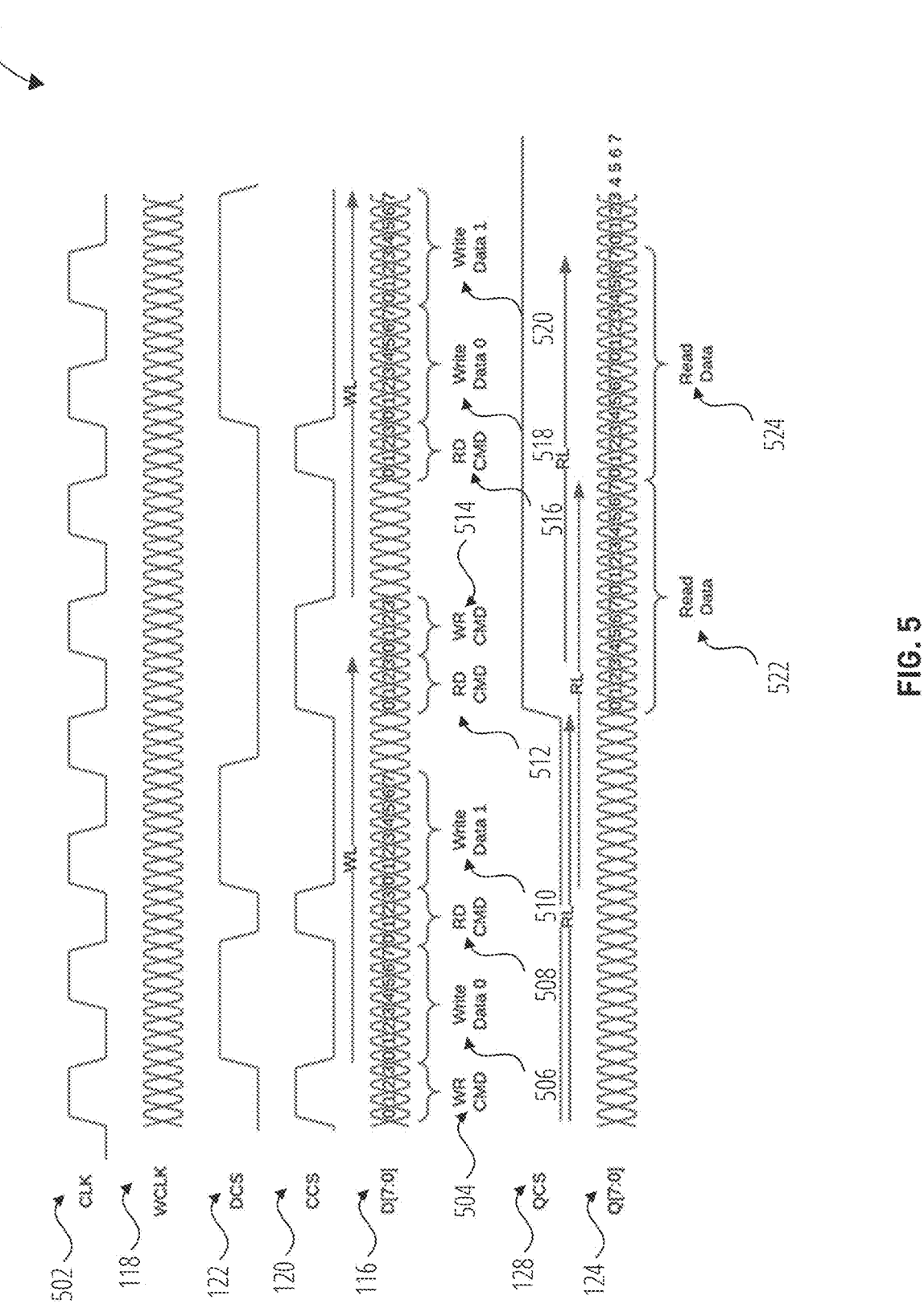
FIG. 5 is a timing diagram illustrating interleaved input with commands and write data on an input port, according to at least one embodiment.

In at least one embodiment, the interleaved input 116 includes a third input packet with a first read command. The third input packet can be received between the first input packet and the second input packet, as illustrated in FIG. 5.

As described above, the memory device 100 can provide write error protection using the write protection mechanism 134. When an error is detected, such as by the SDB device, the write protection mechanism 134 can be activated. When activated, the write protection mechanism 134 can prevent write data received on the input port 108 from being written to the memory array 106. In at least one embodiment, the memory device 100 can receive the first command signal 120 and the second command signal 122 at the same time to indicate activation of the write protection mechanism 134. In at least one embodiment, the write data is stored in the write buffer 132, and the write protection mechanism 134 can prevent the write data from being written to the memory array 106 from the write buffer 132. In at least one embodiment, the write protection mechanism 134 includes circuitry or logic coupled to the write buffer 132 and the command decoder 130. The circuitry can signal to mask or otherwise prevent the write data in the 132 from being loaded into the sense amplifiers used to write to the memory array 106 (also referred to as a memory core).

In at least one embodiment, the write protection mechanism 134 includes a mask function. The mask function can mask the write data in response to activation of the write protection mechanism 134. In at least one embodiment, the write protection mechanism 134 includes an abort function. The abort function can abort a write operation in response to an activation of the write protection mechanism 134. In at least one embodiment, the write protection mechanism 134 can leverage an existing mask mechanism of the memory device 100 to prevent the write data from being written to the memory array 106. In at least one embodiment, the write protection mechanism 134 can include both a mask function and an abort function. The mask function can be activated in some scenarios, and the abort function can be activated in other scenarios.

In at least one embodiment, the write protection mechanism 134 is activated in response to an error detected by a serial buffer device coupled to the memory device 100 over a serial link. In at least one embodiment, the write protection mechanism 134 is activated in response to a data error, an anomaly condition, an illegal command, or a timing error detected by a serial buffer device coupled to the memory device 100 over a serial link. The write protection mechanism 134 can be activated by any condition that would be destructive to the state of the memory array 106.

In at least one embodiment, the write protection mechanism 134 is activated in response to an unused status state of the first command signal 120 (e.g., a chip select signal (e.g., CCS) or command select signal) and the second command signal 122 (e.g., a data select signal (e.g., DCS)). The unused status state can represent a write protection selection. In at least one embodiment, the write protection mechanism 134 can prevent the write data from being written to the memory array 106 in response to receiving both an activated data select signal (e.g., DCS) and an activated chip select signal (e.g., CCS).

In at least one embodiment, the write protection mechanism 134 can be activated in response to an error signal received on a dedicated pin (not illustrated in FIG. 1). In at least one embodiment, the write protection mechanism 134 can be activated in response to an unused command type. In other embodiments, the write protection mechanism 134 can be activated using information provided by the SDB device, such as illustrated and described below with respect to FIG. 4.

Figure 2:
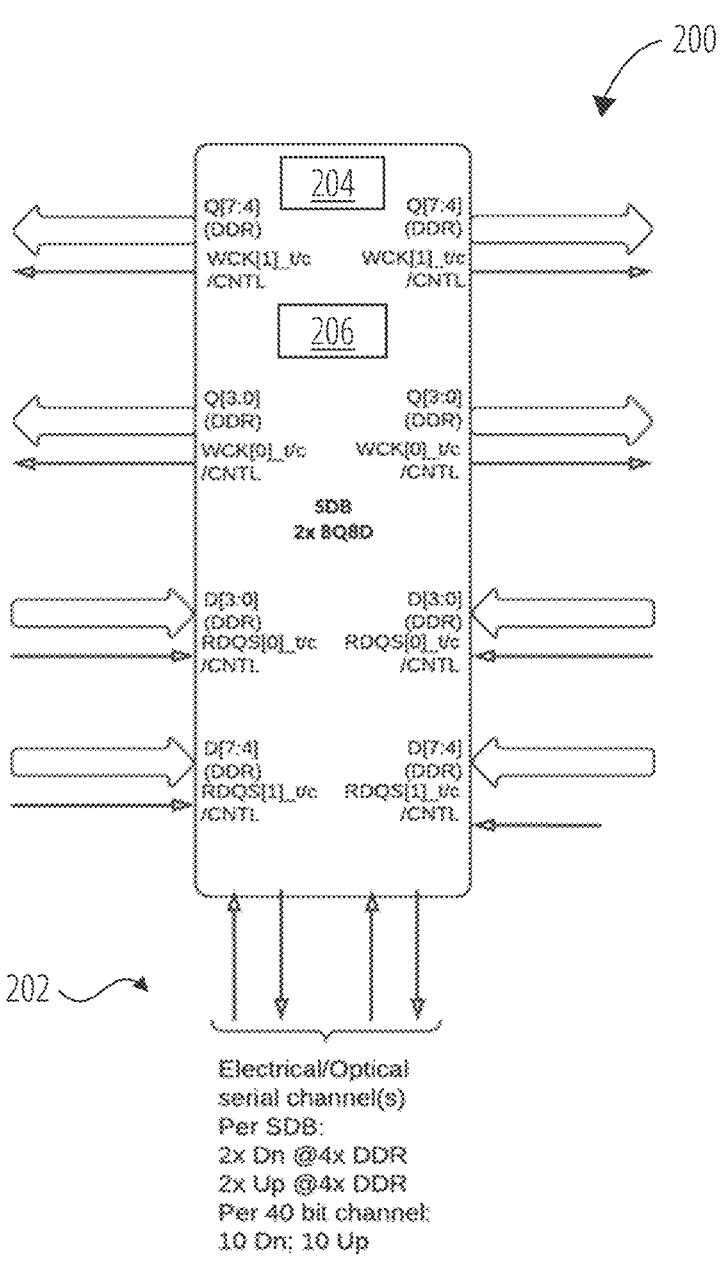
FIG. 2 is a block diagram of an integrated circuit serial data buffer (SDB) device with unidirectional ports and write error protection, according to at least one embodiment.

FIG. 2 is a block diagram of an integrated circuit serial data buffer (SDB) device 200 with unidirectional ports and write error protection, according to at least one embodiment. The SDB device 200 can include serial interfaces coupled to multiple serial channels 202 (e.g., electrical or optical serial channels). The SDB device 200 can include multiple interfaces coupled to multiple memory devices. A first interface can be coupled to the input port 108 of memory device 100 to send the interleaved input 116 (e.g., command or write data). A second interface can be coupled to the output port 112 of memory device 100 to receive output data 124. The first interface can send the first timing reference 118. The second interface can receive the second timing reference 126. The SDB device 200 includes an error checking mechanism 204 and a write protection mechanism 206. The error checking mechanism 204 can check for errors, anomaly conditions, illegal commands, timing errors, etc. The write protection mechanism 206 can activate the write protection mechanism 134 of memory device 100 in response to errors, anomaly conditions, illegal commands, timing errors, or the like, detected by the error checking mechanism 204. As described above, the write protection mechanism 134 can be activated in various manners. In at least one embodiment, the write protection mechanism 206 can activate both the DCS and CCS signals. The write protection mechanism 134 can receive both the activated DCS and CCS signals and prevent write data from being written to the memory array 106 in response.

In at least one embodiment, the SDB device 200 can pass through an activate read command (ACT/RD) and an activate write command (ACT/WR) to the memory device 100 before an error check is done by the error checking mechanism 204. If errors are detected for the ACT/RD command, the write protection mechanism 206 can discard data returned by the memory device 100 and return a replay request. If errors are detected for the ACT/WR command, the write protection mechanism 206 can abort the write command or mask the write data. For example, the write protection mechanism 206 can abort if the error is detected before a last portion of the write data is sent to the memory device 100, and the write protection mechanism 206 can mask if the error is detected before a first portion of the write data is sent to the memory device 100. Other commands (e.g., RD-ACT or WR-ACT and RD-RC or WR-RC) can be passed along. Those commands that are destructive to the memory device 100 can be write-protected when an error is detected by the error-checking mechanism 204.

In at least one embodiment, an abort is signaled with the CSS and DCS asserted at the same time. Alternatively, other options are available to signal an abort. In at least one embodiment, the CSS and DCS can both be asserted at any write data cycle to abort a complete data transfer. In at least one embodiment, the CSS and DCS can both be asserted at any write data cycle to mask the write data at that cycle. In at least one embodiment, the CSS and DCS can be asserted multiple times to abort a complete data transfer or mask multiple portions of the data transfer. In at least one embodiment, the signaling conditions can be stored in registers of the SDB device 200 and memory device 100. In another embodiment, the error signal(s) (or activation signal(s)) can be sent via dedicated signaling lines to mask the write data or abort the write operation (or other destructive operation) in response to errors or other conditions being detected by the error checking mechanism 204.

Figure 3:
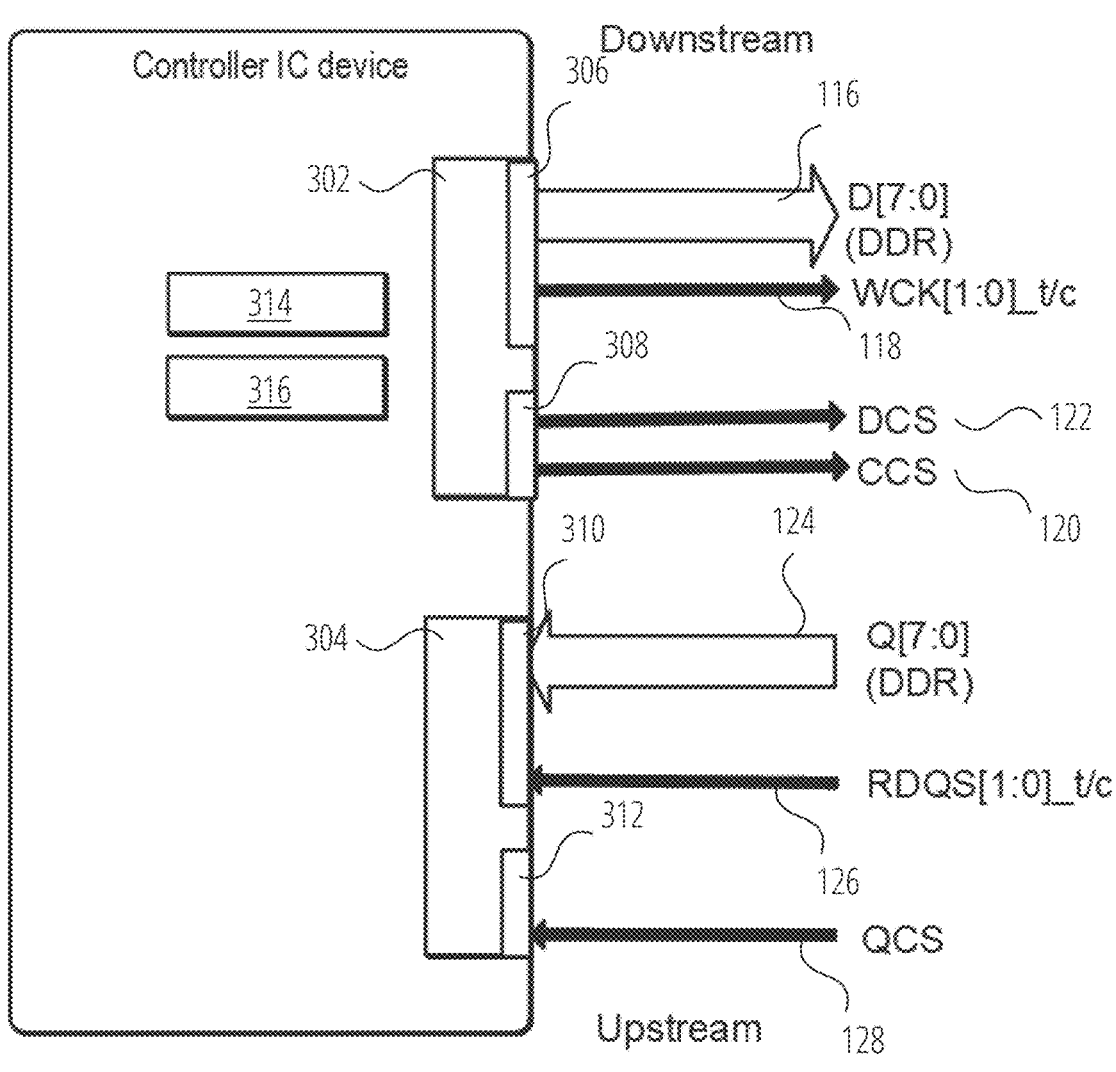
FIG. 3 is a block diagram of an integrated circuit controller device with unidirectional ports and write error protection, according to at least one embodiment.

FIG. 3 is a block diagram of an integrated circuit controller device 300 with unidirectional ports and write error protection, according to at least one embodiment. The integrated circuit controller device 300 (hereinafter "controller device 300") includes a downstream serial interface 302 and an upstream serial interface 304. The downstream serial interface 302 includes an output port 306 and a control port 308. The upstream serial interface 304 includes an input port 310 and a control port 312. In at least one embodiment, the output port 306, the control port 308, the input port 310, and the control port 312 are unidirectional ports.

In at least one embodiment, the output port 306 transmits interleaved input 116 and a first timing reference 118 to a memory device (e.g., 100). As described above, the first timing reference 118 can be differential clock strobes (e.g., WCK[1:0]_t/c). The first timing reference 118 can be a single-ended clock signal or strobe. The interleaved input 116 can include commands (e.g., read commands, write commands) and write data. The control port 308 transmits one or more control signals that specify that the interleaved input is the one or more commands or the write data to the memory device (e.g., 100). As illustrated in FIG. 3, the control port 308 sends a first command signal 120 (e.g., CCS) that specifies that the interleaved input 116 is a command or a second command signal 122 (e.g., DCS) that specifies that the interleaved input 116 is write data. The first command signal 120 can be a chip select type signal, a strobe signal, an enable signal, a command enable signal, or the like. In at least one embodiment, the first command signal 120 and the second command signal 122 can be communicated as different levels of the same signal. Using two command signals allows four states to be used, including a command state, a data state, a status state (e.g., both the first command signal 120 and the second command signal 122 being asserted together), and a reserved state, for example.

In at least one embodiment, the input port 310 receives output data 124 and a second timing reference 126 from a memory device (e.g., 100). The output data 124 can be read data, status data, error data, write acknowledgments, or the like. The second timing reference 126 can be a clock signal, such as differential clock strobes (e.g., RDQS[1:0]_t/c). The second timing reference 111 can be a differential clock signal or a single-ended clock signal, or a strobe. In at least one embodiment, the output port 306 transmits write data, and input port 310 receives read data concurrently. In at least one embodiment, the output port 306 transmits command data, and the input port 310 receives read data concurrently. The control port 312 receives one or more control signals that specify that the input port 310 is enabled or ready with the read data. As illustrated in FIG. 3, the control port 312 receives an output enable signal 128 (QCS) that specifies that the input port 310 is enabled for the read data. The output enable signal 128 can be a chip select type signal, a strobe signal, an enable signal, a command enable signal, or the like.

In at least one embodiment, the output port 306 and the input port 310 allow for concurrent interface operations, such as write data and read data being transferred concurrently or at the same time. Using the separate output port 306 and the input port 310, there are no turnaround delays by the memory device because the read and write transfers can co-occur. This can reduce the overall latency of the memory device.

During the operation of the controller device 300, the interleaved input 116 can include a first input packet with a first command and a second input packet with first write data. The first timing reference 118 includes a write clock signal (WCK) for the write data's timing. The write clock signal can be one or two input strobes (e.g., two input strobes when the clock signal is a differential clock signal). The controller device 300 sends the first command signal 120 when the interleaved input 116 is the first command and sends the second command signal 122 when the interleaved input is the first write data. The first command signal 120 and the second command signal 122 specify whether the outgoing packet is a command or write data. In at least one embodiment, the controller device 300 includes a command encoder 314 and a write protection mechanism 316. The command encoder 314 is enabled and outputs the first command and the first command signal 120 that specifies that the interleaved input 116 is a command (e.g., a write command, a read command, or the like). The command encoder 314 is disabled when the interleaved input 116 is write data. The write data and the second command signal 122 are transmitted on the output port 306.

In some cases, the command encoder 314 can send a command to activate the write protection mechanism 134 on the memory device 100. The command encoder 314 can send the command in response to an error detected by the controller device 300. The controller device 300 can provide write error protection using the write protection mechanism 316. When an error is detected, such as by the controller device 300, the write protection mechanism 316 can activate the write protection mechanism 134 on the memory device 100. When activated, the write protection mechanism 134 can prevent write data received on the input port 108 from being written to the memory array 106. In at least one embodiment, the write protection mechanism 316 can send the first command signal 120 and the second command signal 122 at the same time to indicate activation of the write protection mechanism 134. In at least one embodiment, the write protection mechanism 316 can activate the write protection mechanism 134 to mask or abort as described herein. In at least one embodiment, the write protection mechanism 316 can activate the write protection mechanism 134 in response to an error detected by the controller device 300 (or the SDB device). In at least one embodiment, the write protection mechanism 316 can activate the write protection mechanism 134 in response to a data error, an anomaly condition, an illegal command, or a timing error detected. The write protection mechanism 316 can activate the write protection mechanism 134 in response to any condition that would be destructive to the state of the memory array 106.

In at least one embodiment, the write protection mechanism 316 can activate the write protection mechanism 134 in response to an unused status state of the first command signal 120 (e.g., a chip select signal (e.g., CCS)) and the second command signal 122 (e.g., a data select signal (e.g., DCS)). The unused status state can represent a write protection selection. In at least one embodiment, the write protection mechanism 134 can prevent the write data from being written to the memory array 106 in response to receiving both an activated data select signal (DCS) and an activated chip select signal (e.g., CCS).

In at least one embodiment, the write protection mechanism 316 can activate the write protection mechanism 134 in response to an error signal sent on a dedicated pin (not illustrated in FIG. 3). In at least one embodiment, the write protection mechanism 316 can activate the write protection mechanism 134 in response to an unused command type. In other embodiments, the write protection mechanism 316 can activate the write protection mechanism 134 using other information.

During the operation of the controller device 300, the output data 124 can include a first output packet with first read data. The second timing reference 126 can include a read clock signal. The read clock signal can be one or two read clock strobes (e.g., RDQS[1:0]_t/c when the read clock signal is a differential signal). The output data 124 can include a second output packet with first status data, write acknowledgment, errors, or the like. The controller device 300 receives the output enable signal 128. The output enable signal 128 can specify that the first read data is enabled on the input port 310. Alternatively, the controller device 300 receives the output enable signal 128 to specify that status data, error data, or the like is ready or enabled on the input port 310.

In at least one embodiment, the interleaved input 116 includes a third input packet with a first read command. The third input packet can be sent between the first input packet and the second input packet by the controller device 300 and received by the memory device 100, as illustrated in FIG. 5.

In at least one embodiment, the controller device 300 can program a register of the memory device 100 to store a WL value, as described above.

In at least one embodiment, the functionality of the controller device 300 can be integrated into the SDB devices described and illustrated with respect to FIG. 2, FIG. 4, FIG. 7, FIG. 8, and FIG. 9.

Figure 4:
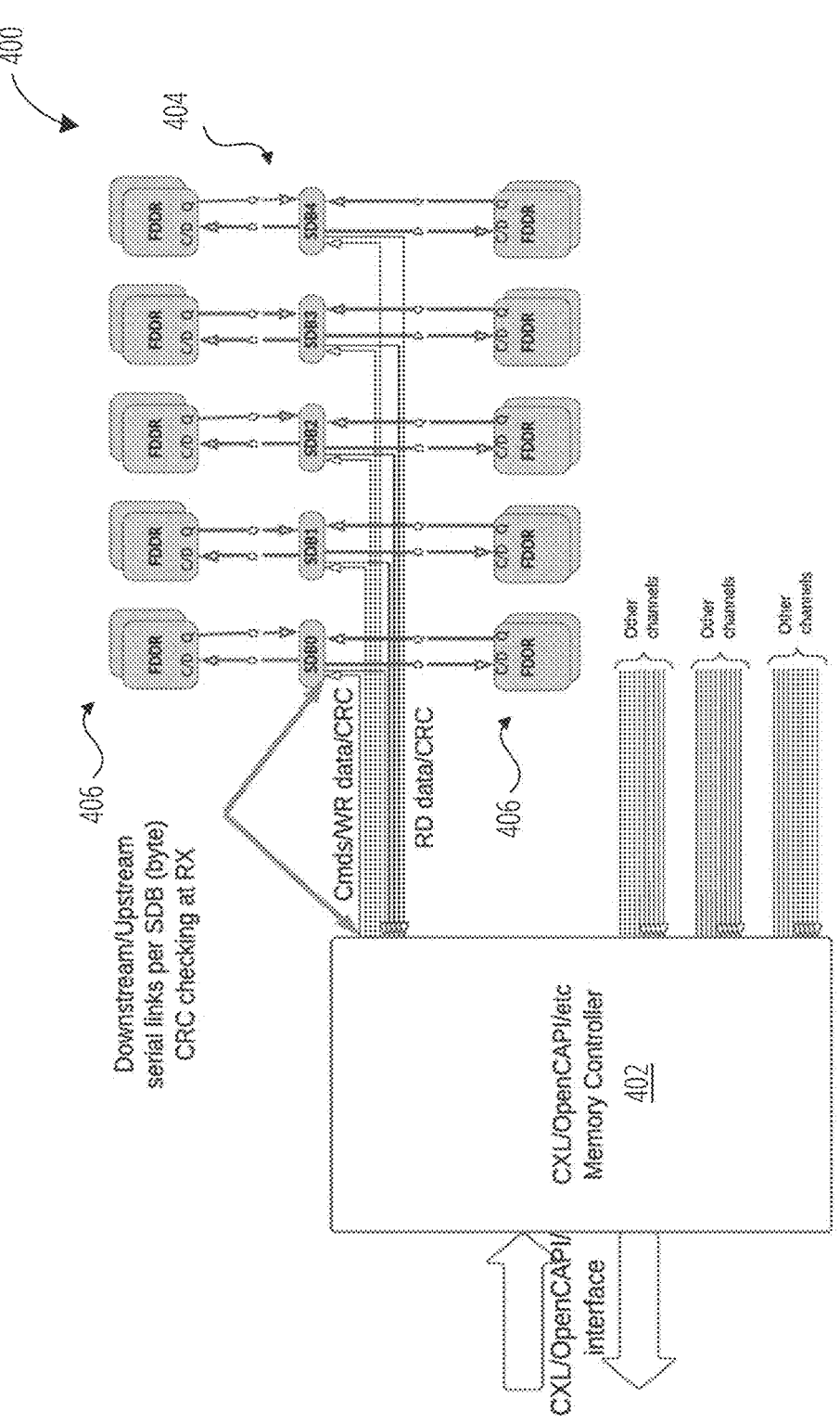
FIG. 4 is a block diagram of a memory system with a memory controller, multiple SDB devices, and multiple memory devices with write error protection, according to at least one embodiment.

FIG. 4 is a block diagram of a memory system 400 with a memory controller 402, multiple SDB devices 404, and multiple memory devices 406 with write error protection, according to at least one embodiment. In at least one embodiment, the memory controller 402 is the controller device 300 of FIG. 2. The memory controller 402 can support the Compute Express Link (CXL) protocol, Open-CAPI protocol, or other serial protocols. The memory controller 402 is coupled to multiple SDB devices 404 via downstream serial links and upstream serial links, one downstream serial link and upstream serial link per each SDB device 404. The SDB devices 404 can be the SDB device 200 of FIG. 2. The downstream serial links can carry commands, write data, and error information (e.g., Cycle Redundancy Check (CRC), Forward Error Correction (FEC), Error Correction Code(ECC), or the like). The upstream serial links can carry read data and error information (e.g., CRC, FEC, ECC, or the like). The error information can be used to check for errors at the SDB devices 404. For example, using the error information, the SDB device can include error-checking logic to check for errors in the commands, read data, write data, etc. Each of the memory devices 406 can be the memory device 100 of FIG. 1 and includes a write protection mechanism. In the event that an error is detected, the SDB device can activate a write protection mechanism on the corresponding memory device 406, as described herein.

FIG. 5 is a timing diagram 500 illustrating interleaved input 116 with commands and write data on an input port, according to at least one embodiment. The timing diagram 500 illustrates signals received by and sent from the memory device 100 of FIG. 1. The timing diagram 500 includes a clock signal 502. The clock signal 502 can be used for operations performed on the memory device 100 of FIG. 1. The timing diagram 500 includes the first timing reference 118 (e.g., a write clock) used in connection with the interleaved input 116. The timing diagram 500 also includes the first command signal 120 (e.g., CCS) and the second command signal 122 (e.g., DCS). The interleaved input 116 includes a first write command 504, first write data 506, a first read command 508, second write data 510, a second read command 512, a second write command 514, a third read command 516, third write data 518, and fourth write data 520. The first write data 506 and the second write data 510 can correspond to the first write command 504, the third write data 518, and the fourth write data 520 can correspond to the second write command 514.

As illustrated in FIG. 5, when the first command signal 120 (e.g., CCS) is active in a first instance, the interleaved input 116 is the first write command 504. In the next instance, the first command signal 120 is active, and the interleaved input 116 is the first read command 508. When the second command signal 122 (e.g., DCS) is active in the first instance, the interleaved input 116 is the first write data 506. In the next instance, the second command signal 122 is active, and the interleaved input 116 is the second write data 510. Similarly, as the first command signal 120 is active, commands are received on the input port. As the second command signal 122 is active, write data is received on the input port.

As illustrated in FIG. 5, after the first write command 504 is received at the input port, a write latency (WL) counter can be started. For example, a first WL value can specify an amount of time (e.g., a minimum amount of time) before the second write command 514 can be issued on the input port. Once the second write command 514 is issued, a second WL value can specify an amount of time before another write command can be issued on the input port. As described herein, the WL value can be an amount of time between when a write command is received at the input port and the corresponding write data is transferred to the memory array. In at least one embodiment, the write data (e.g., first write data 506 and second write data 510) must be pre-loaded into the write before the first WL value in the WL counter expires. In another embodiment, whatever write data is loaded in the write buffer is transferred at the write command. This can occur when new write data for a subsequent write command is sent. In another, the WL value can be an intermediate value that is specified in a register of the memory device 100. In at least one embodiment, the first command signal 120 loads the command decoder, and the second command signal 122 loads the write buffer. In at least one embodiment, whatever data is loaded into the write buffer at the WL value is transferred to the memory array.

As illustrated in FIG. 5, after the first read command 508 is received on the input port, there is a read latency between when the read command is received, and the data is available on the output port. The output enable signal 128 (QCS) is active when the output data 124 is ready on the output port. For example, first read data 522 is available on the output port when the output enable signal 128 is active. Since the output port is not shared with the write data, the output port can continue to make read data available, such as illustrated in FIG. 5. The output enable signal 128 remains active, and second read data 524 is available on the output port. In at least one embodiment, the second timing reference 126 (not illustrated in FIG. 5) is similar to the first timing reference 118. In another embodiment, the first timing reference 118 and the second timing reference 126 are different frequencies as described herein. Although FIG. 5 illustrates the normal operation of the memory device 100, there are instances where errors or other conditions are detected, and the memory device 100 needs to be write-protected, such as illustrated in the timing diagram of FIG. 6.

Figure 6:
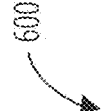
FIG. 6 is a timing diagram illustrating interleaved input with commands and write data on an input port and write error protection activated, according to at least one embodiment.
Figure 6:
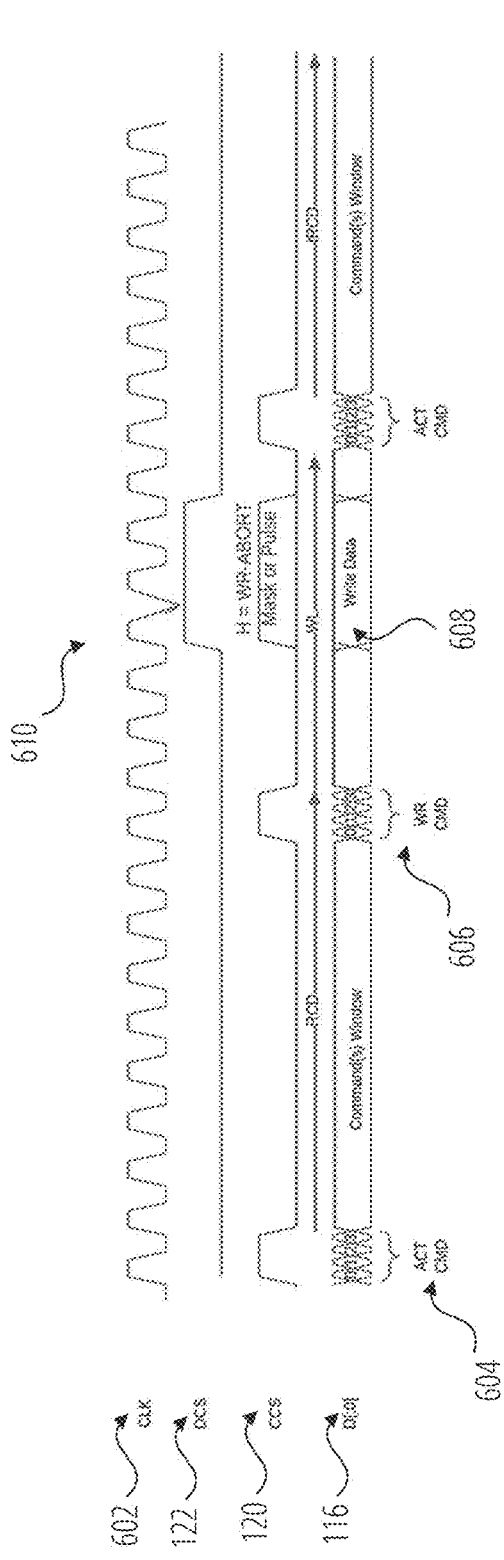

FIG. 6 is a timing diagram 600 illustrating interleaved input 116 with commands and write data on an input port and write error protection activated, according to at least one embodiment. The timing diagram 600 illustrates signals received by and sent from the memory device 100 of FIG. 1. The timing diagram 600 includes a clock signal 602. The clock signal 602 can be used for operations performed on the memory device 100 of FIG. 1. The timing diagram 600 includes the first command signal 120 (e.g., CCS), the second command signal 122 (e.g., DCS), and interleaved input 116. The interleaved input 116 includes an activate command 604, a write command 606, and a write data 608. The write data 608 can correspond to the write command 606. An error can be detected in connection with the write command 606 or the write data 608. In response to the error, the memory device receives an activated CCS (120) and activated DCS (122) at the same time, representing the write protection activated 610. The write data 608 can be masked, or the write command 606 can be aborted by the write protection mechanism 134, as described herein.

As described herein, the SDB devices can have a minimal fixed latency for read and write commands with or without errors. This simplifies the fast-path SDB logic. The SDB logic can convert serial data to parallel data and put the data on the pins of the SDB device. The SDB can detect errors, such as CRC errors, FEC errors, ECC errors, protocol violations, illegal commands, and other anomalies. The write protection mechanism can allow out-of-band error checking (e.g., ECC checking), allowing a pass-through FDDR protocol to pass through commands and data and prevent destructive conditions using the write protection mechanism.

As described herein, the FDDR (e.g., DRAM) includes an input port for commands and write data and a read data output port for read data. The FDDR (e.g., DRAM) has a write protection mechanism to prevent the write data from being written to a memory core (prevent a write to the core from executing) when an error or other anomaly is detected. In at least one embodiment, the write protection mechanism is shared with a write masking function mechanism. In at least one embodiment, the write data is buffered, and the write operation is delayed. In at least one embodiment, the unused state of data select and chip select controls can be used to indicate mask selection/write-protect selection. In some cases, the unused state is both these controls being active at the same time. In some embodiments, the SDB device can check for errors and assert the write protection mechanism.

The error checking can have an impact on latency. Some SDB devices can use fast replay or FEC to reduce the average latencies due to link errors. Also, some protocols, such as CXL protocol and OpenCAPI must verify, correct, and/or replay a unit of data (e.g., a flit) before it can be used. The fast-path implementation can allow the buffer device to start reading without an error check and discard the data if there is an error. Similarly, the fast-path implementation can allow the buffer device to start sending the write data without error checking and block the write data from being written when an error is detected since the DRAM cycle can be aborted or the mask data can be masked using the write protection mechanism described herein.

In some cases, the DRAM has a high latency, for example, DDR5 DRAM has 14 nanoseconds latency for ACT-CMD and CMD-DATA. This allows for relaxed error checking. Even though error checks have an impact on latency and serial protocols need to be tolerant to link errors, the write protection mechanism can prevent writing the write data to the memory core when errors are detected without impacting latency. The write protection mechanism can be used in connection with fast replay and FEC, which are used to reduce average latencies due to link errors for both read and write operations. The write protection mechanism can be used in connection with serial protocols, such as CXL and OpenCAPI, that verify, correct, and replay a flit before it can be used.

Figure 7:
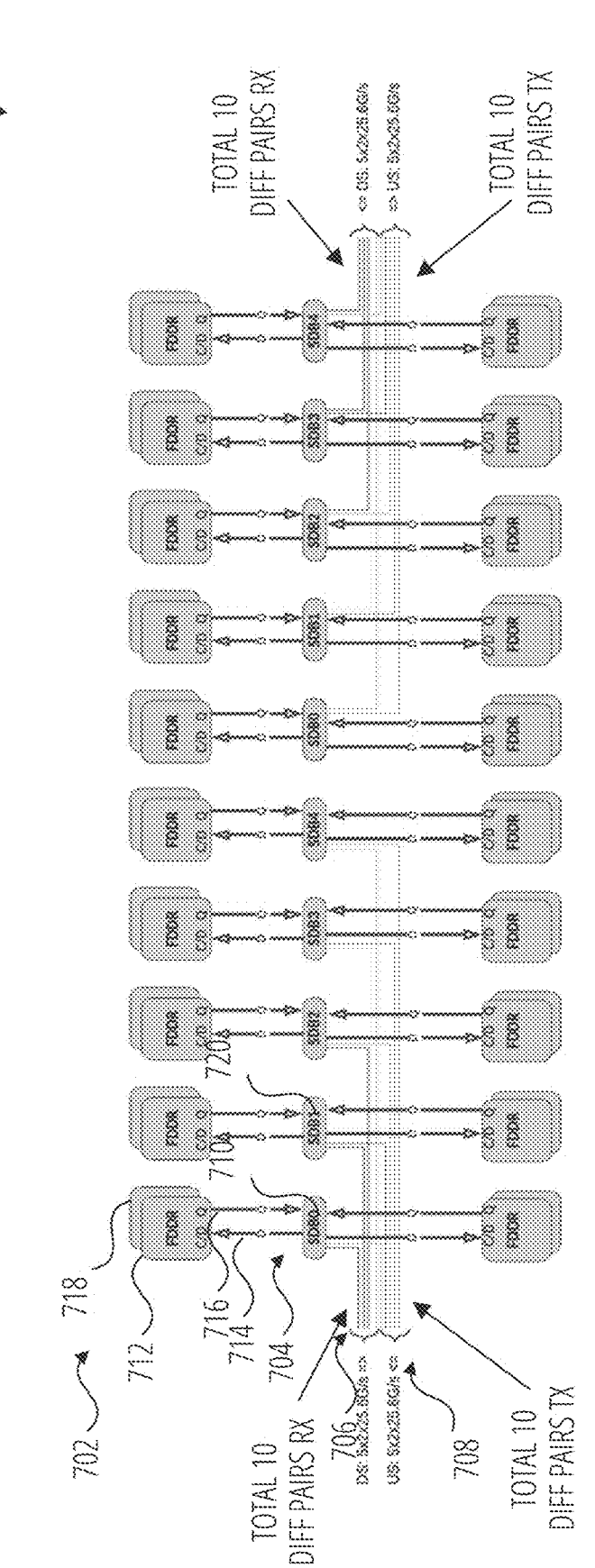
FIG. 7 is a block diagram illustrating a memory module with DRAM devices with unidirectional ports and SDB devices with write error protection, according to at least one embodiment.

FIG. 7 is a block diagram illustrating a memory module 700 with DRAM devices 702 with unidirectional ports and SDB devices 704 with write error protection, according to at least one embodiment. The memory module 700 includes multiple DRAM devices 702 and multiple SDB devices 704. The memory module 700 can be coupled to one or more host computing devices or controller devices (not illustrated in FIG. 7) via downstream serial links 706 and upstream serial links 708. In one embodiment, the memory module 700 includes a downstream serial interface and an upstream serial interface, and multiple SDB devices 704 coupled to the downstream serial interface and the upstream serial interface. Multiple DRAM devices 702 are coupled to the SDB devices 704.

As illustrated in FIG. 7, two DRAM devices 702 are coupled to an SDB device 704, and each SDB device is coupled to a memory controller of a host computing system. In particular, a first SDB device 710 is coupled to a downstream serial interface and an upstream serial interface, and a first DRAM device 712 is coupled to the first SDB device 710. The first DRAM device 712 includes an input port coupled to input lines 714 (D lines) and an output port coupled to output lines 716 (Q lines). The input port of the first DRAM device 712 receives interleaved input that includes commands or write data on the input lines 714. The output port of the first DRAM device 712 transmits read data on the output lines 716. The first DRAM device 712 can include a control port that receives one or more timing reference signals and one or more control signals that specify that the interleaved input is the command or write data on the input lines 714. The first DRAM device 712 includes a write protection mechanism, such as the write protection mechanism 134 described above with respect to FIG. 1.

A second DRAM device 718 can also be coupled to the first SDB device 710. The second DRAM device 718 includes an input port coupled to input lines 714 (D lines) and an output port coupled to output lines 716 (Q lines). The input port of the second DRAM device 718 receives interleaved input that includes commands or write data on input lines 714. The output port of the second DRAM device 718 transmits read data on the output lines 716. The second DRAM device 718 can include a control port that receives one or more timing reference signals and one or more control signals that specify that the interleaved input is the command or write data on the input lines 714. The second DRAM device 718 can include a write protection mechanism, such as the write protection mechanism 134 described above with respect to FIG. 1.

As illustrated in FIG. 7, the memory module 700 includes a second SDB device 720 coupled to the downstream serial interface and the upstream serial interface. A third DRAM device and a fourth DRAM device can be coupled to the second SDB device 720 and include similar ports as the first and second DRAM devices. Similarly, other DRAM devices are coupled as pairs to the other SDB devices. As illustrated in FIG. 7, the DRAM devices 702 and the SDB devices 704 are organized as a first set of ten DRAM devices coupled as pairs to a first set of five SDB devices and a second set of ten DRAM devices coupled as pairs to a second set of five SDB devices. Alternatively, other configurations of coupling the DRAM devices and SDB devices are possible.

Each SDB device 704 includes a differential pair of receivers and a differential pair of transmitters. The downstream serial interface can include ten differential pairs of receiver lines, and the upstream serial interface can include ten differential pairs of transmitter lines. The first SDB device 710 can receive input serially on the differential pair of receivers and pass the serial input as parallel inputs to the first DRAM device 712 on the input lines 714. The first SDB device 710 can receive output data from the first DRAM device 712 on the output lines 716 and pass the output data as serial data on the differential pair of transmitters.

Figure 8:
FIG. 8 is a block diagram illustrating a memory module with DRAM devices with unidirectional ports, SDB devices, Optical-to-Electrical (O2E) converters, and Electrical-to-Optical (E2O) converters, according to at least one embodiment.
Figure 8:
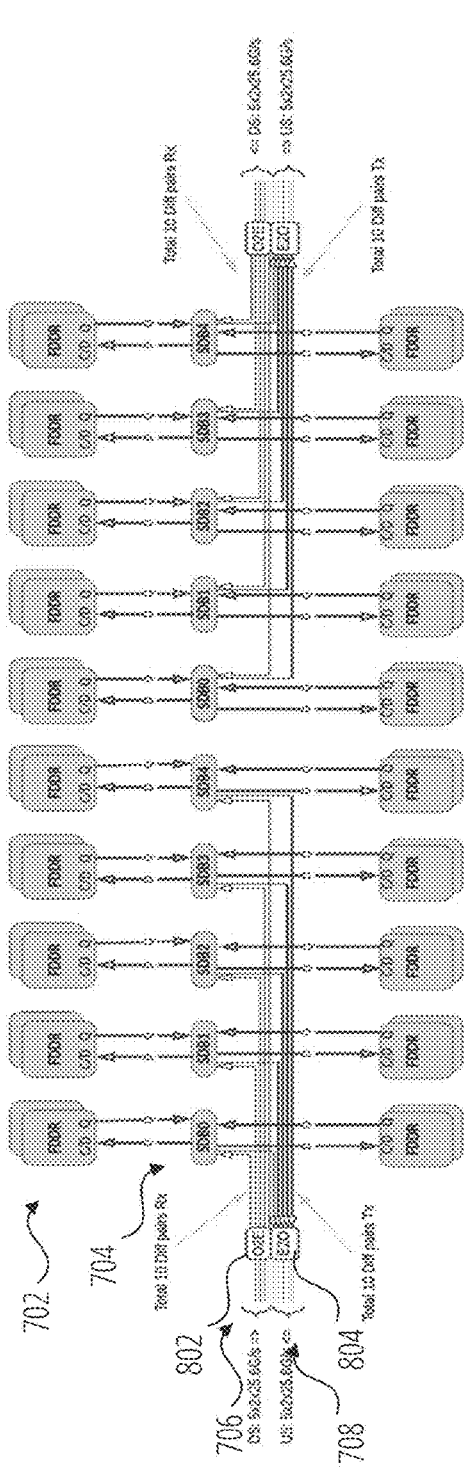

FIG. 8 is a block diagram illustrating a memory module 800 with DRAM devices with unidirectional ports, SDB devices, O2E converters, and E2O converters, according to at least one embodiment. The memory module 800 is similar to memory module 700, as noted by similar reference numbers. As illustrated in FIG. 8, the memory module 800 includes a downstream serial interface and an upstream serial interface. The downstream serial interface and the upstream serial interface are optical-to-electrical interfaces that include optical links and electrical links. Multiple SDB devices are coupled to the downstream serial interface and the upstream serial interface via O2E converters 802 and E2O converters 804. An O2E converter 802 converts an optical signal to an electrical signal, and an E2O converter 804 converts an electrical signal to an optical signal. In at least one embodiment, a first O2E converter is coupled to the first SDB device 710 via the downstream serial interface, and a first E2O converter is coupled to the first SDB device 710 via the upstream serial interface.

Figure 9:
FIG. 9 is a block diagram illustrating a memory module with DRAM devices with unidirectional ports and optical SDB devices, according to at least one embodiment.
Figure 9:
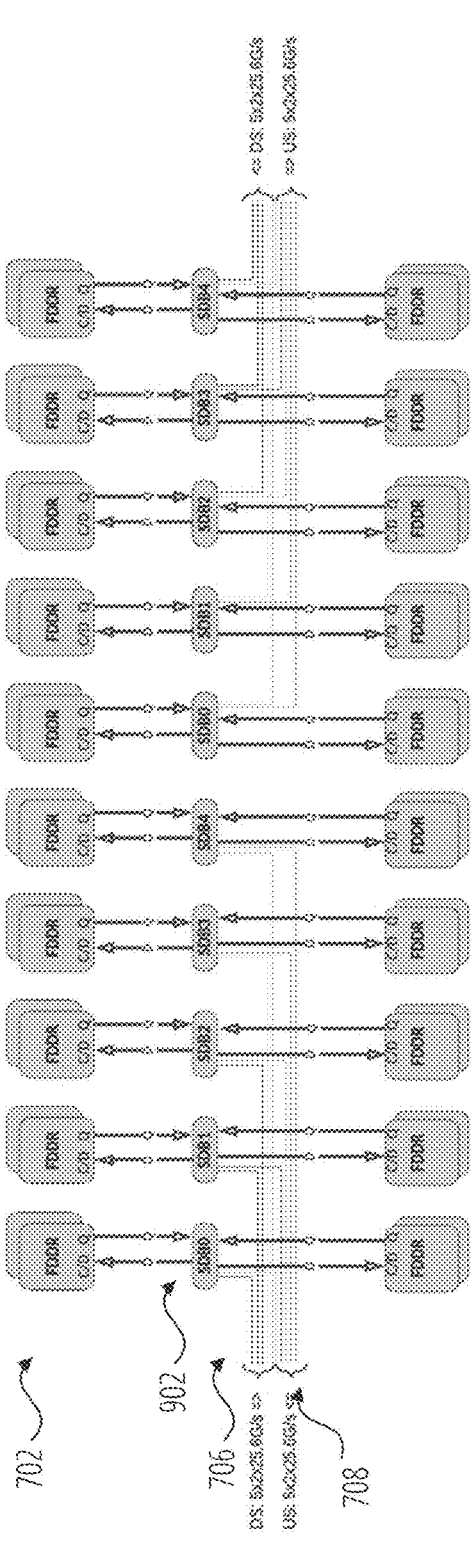

FIG. 9 is a block diagram illustrating a memory module 900 with DRAM devices 702 with unidirectional ports and optical SDB devices 902, according to at least one embodiment. The memory module 900 is similar to memory module 700, as noted by similar reference numbers. As illustrated in FIG. 9, the memory module 900 includes a downstream serial interface and an upstream serial interface, each including optical links coupled to multiple optical SDB devices 902.

Figure 10:
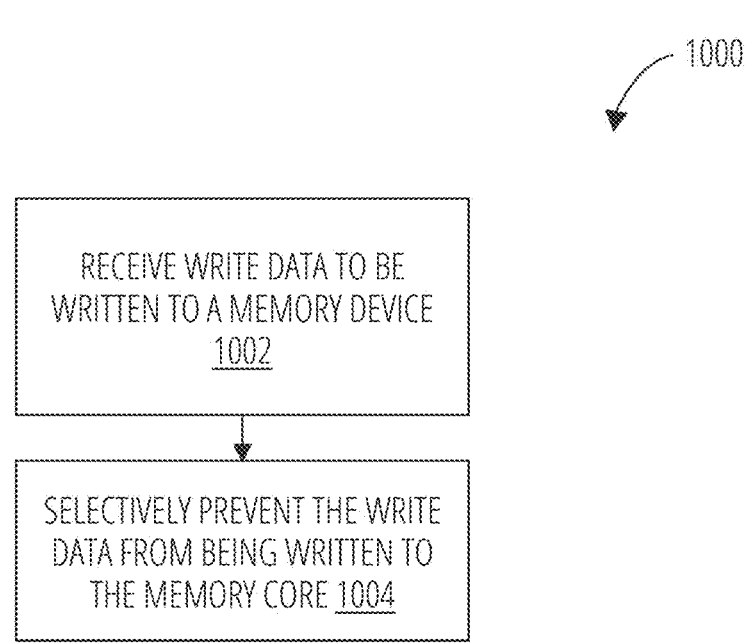
FIG. 10 is a flow diagram of a method for operating a memory device with write error protection, according to an embodiment.

FIG. 10 is a flow diagram of a method 1000 for operating a memory device with write error protection, according to an embodiment. The method 1000 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 1000 is performed by the memory device 100 of FIG. 1. In another embodiment, the method

1000 is performed by any of the memory system 400 of FIG. 4, the memory module 700 of FIG. 7, the memory module 800 of FIG. 8, or the memory module 900 of FIG. 9.

Referring to FIG. 10, at block 1002, method 1000 begins by the processing logic receiving, at an input port of a DRAM device with the input port to receive commands and a read data output port, write data to be written to a memory core of the DRAM device. At block 1004, the processing logic selectively prevents the write data from being written to the memory core.

In at least one embodiment, at block 1004, the processing logic can prevent the write data from being written by masking the write data. In at least one embodiment, at block 1004, the processing logic can prevent the write data from being written by aborting a write operation associated with the write data.

In a further embodiment, the processing logic can buffer the write data before a write operation of the write data. The processing logic prevents the write data from being written to the memory core from the buffer in connection with the write operation.

In at least one embodiment, at block 1004, the processing logic can prevent the write data from being written in response to an unused status state of a data select signal and a chip select signal. The unused status state can represent a write protection selection.

In at least one embodiment, at block 1004, the processing logic can prevent the write data from being written in response to receiving both an activated data select signal and an activated chip select signal.

In at least one embodiment, at block 1004, the processing logic can prevent the write data from being written in response to an error detected by a serial buffer device coupled to the DRAM device over a serial link.

In at least one embodiment, at block 1004, the processing logic can prevent the write data from being written in response to at least one of a data error, an anomaly condition, an illegal command, or a timing error detected by a serial buffer device coupled to the DRAM device over a serial link.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A dynamic random-access memory (DRAM) device comprising:
an input port to receive interleaved input comprising commands and write data;
a read data output port to output read data;
a memory core to store data including the write data and the read data; and
a write protection mechanism to selectively prevent the write data from being written to the memory core in response to receiving both an activated data select signal and an activated chip select signal.

2. The DRAM device of claim 1, wherein the write protection mechanism comprises an abort function.

3. The DRAM device of claim 1, wherein the write protection mechanism comprises a mask function.

4. The DRAM device of claim 1, wherein the write protection mechanism comprises an abort function and a mask function.

5. The DRAM device of claim 1, wherein the write protection mechanism is activated in response to an error detected by a serial buffer device coupled to the DRAM device over a serial link.

6. The DRAM device of claim 1, wherein the write protection mechanism is activated in response to at least one of a data error, an anomaly condition, an illegal command, or a timing error detected by a serial buffer device coupled to the DRAM device over a serial link.

7. The DRAM device of claim 1, further comprising a buffer to buffer the write data before a write operation of the write data, wherein the write protection mechanism is to prevent the write data from being written to the memory core from the buffer in response to the write operation.

8. The DRAM device of claim 1, wherein the write protection mechanism is to prevent the write data from being written to the memory core in response to an unused status state of a data select signal and a chip select signal, wherein the unused status state represents a write protection selection.

9. A dynamic random-access memory (DRAM) device comprising:
an input port to receive at least one of commands or write data;
a read data output port to output read data;
a memory core to store data including the write data and the read data; and
a write protection mechanism to selectively prevent the write data from being written to the memory core in response to receiving both an activated data select signal and an activated chip select signal.

10. A method of operating a dynamic random-access memory (DRAM) device having an input port to receive commands, and a read data output port, the method comprising:
receiving, at the input port of the DRAM device, write data to be written to a memory core of the DRAM device; and
selectively preventing, by a write protection mechanism of the DRAM device, the write data from being written to the memory core in response to receiving both an activated data select signal and an activated chip select signal.

11. The method of claim 10, wherein preventing the write data from being written comprises masking the write data.

12. The method of claim 10, wherein preventing the write data from being written comprises aborting a write operation associated with the write data.

13. The method of claim 10, further comprising buffering the write data before a write operation of the write data, wherein preventing the write data from being written comprises preventing the write data from being written to the memory core from the buffer in connection with the write operation.

14. The method of claim 10, wherein preventing the write data from being written comprises preventing the write data from being written to the memory core in response to an unused status state of a data select signal and a chip select signal, wherein the unused status state represents a write protection selection.

15. The method of claim 10, wherein preventing the write data from being written comprises preventing the write data from being written to the memory core in response to an error detected by a serial buffer device coupled to the DRAM device over a serial link.

16. The method of claim 10, wherein preventing the write data from being written comprises preventing the write data from being written to the memory core in response to at least one of a data error, an anomaly condition, an illegal command, or a timing error detected by a serial buffer device coupled to the DRAM device over a serial link.

17. An integrated circuit memory device having a memory array, the integrated circuit memory device comprising:

a first port to receive interleaved input comprising commands and write data;

a second port to transmit read data retrieved from the memory array in response to a read command; and a write protection circuit to selectively prevent the write data from being written to a group of cells in response to receiving both an activated data select signal and an activated chip select signal.

18. The integrated circuit memory device of claim 17, wherein the write protection circuit comprises at least one of a mask function or an abort function.

19. An integrated circuit memory device having a memory array, the integrated circuit memory device comprising:

a first port to receive commands or write data;

a second port to transmit read data retrieved from the memory array in response to a read command; and a write protection circuit to selectively prevent the write data from being written to a group of cells in response to both the data select signal and the chip select signal being both activated.

* * * * *